US011092944B2

(12) United States Patent
Mei et al.

(10) Patent No.: US 11,092,944 B2
(45) Date of Patent: Aug. 17, 2021

(54) INTEGRATED 3D-PROTOTYPED ONLINE DYNAMIC BALANCE TERMINAL

(71) Applicant: Xi'an Jiaotong University, Xi'an (CN)

(72) Inventors: XueSong Mei, Xi'an (CN); XiaLun Yun, Xi'an (CN); GeDong Jiang, Xi'an (CN); ZunHao Zhang, Xi'an (CN); Tao Tao, Xi'an (CN)

(*) Notice: Subject to any disclaimer, the term of this patent is extended or adjusted under 35 U.S.C. 154(b) by 180 days.

(21) Appl. No.: 16/471,996

(22) PCT Filed: Jul. 19, 2018

(86) PCT No.: PCT/CN2018/096228
§ 371 (c)(1),
(2) Date: Jun. 20, 2019

(87) PCT Pub. No.: WO2019/136957
PCT Pub. Date: Jul. 18, 2019

(65) Prior Publication Data
US 2020/0387137 A1 Dec. 10, 2020

(30) Foreign Application Priority Data
Jan. 9, 2018 (CN) .......................... 201810019943.7

(51) Int. Cl.
G05B 19/4099 (2006.01)
B23Q 1/70 (2006.01)
(Continued)

(52) U.S. Cl.
CPC .......... G05B 19/4099 (2013.01); B23Q 1/70 (2013.01); B23Q 15/12 (2013.01); F16F 15/162 (2013.01);
(Continued)

(58) Field of Classification Search
CPC ........ F16F 15/162; F16F 15/366; B23Q 1/70; B23Q 15/12; G01M 1/32; G01M 1/323
See application file for complete search history.

(56) References Cited

U.S. PATENT DOCUMENTS 3,950,897 A 4/1976 Birkenstack et al.
4,255,163 A * 3/1981 Sonderegger ......... G01M 1/323
451/343
9,212,723 B2 * 12/2015 Wu ..................... B23Q 11/0035

FOREIGN PATENT DOCUMENTS

CN 104180941 A 3/2014
CN 107363720 A 11/2017
(Continued)

Primary Examiner — Melanie Torres Williams
(74) Attorney, Agent, or Firm — Novoclaims Patent Services LLC; Mei Lin Wong

(57) ABSTRACT

An integrated online dynamic balance terminal by 3D rapid prototyping includes a central tapered hole formed at a lower portion thereof, a plurality of identical balance cavities peripherally and spacedly formed on the integrated online dynamic balance terminal. Each two the adjacent balance cavities are separated by a cavity partition. The integrated online dynamic balance terminal further has a plurality of guiding channels indently formed on an inner peripheral surface thereof, wherein each of the four guiding channels communicates with a corresponding balance cavity through a corresponding trapezoidal hole. The integrated online dynamic balance terminal has a plurality of bored holes spacedly formed on an engagement surface. The integrated online dynamic balance terminal is configured from 3D rapid prototyping so as to form an integral one-piece structure, wherein some portions requiring high precision are arranged to undergo additional machining processes.

2 Claims, 3 Drawing Sheets

(51) Int. Cl.
  *B23Q 15/12* (2006.01)
  *F16F 15/16* (2006.01)
  *F16F 15/36* (2006.01)

(52) U.S. Cl.
  CPC .. *F16F 15/366* (2013.01); *G05B 2219/33099* (2013.01); *G05B 2219/49017* (2013.01); *G05B 2219/49023* (2013.01)

(56) References Cited

FOREIGN PATENT DOCUMENTS

| | | | |
|---|---|---|---|
| CN | 108098459 A | 6/2018 | |
| CN | 207757342 U | 8/2018 | |
| DE | 3606618 A1 * | 9/1987 | ............. B24D 5/165 |

* cited by examiner

INTEGRATED 3D-PROTOTYPED ONLINE DYNAMIC BALANCE TERMINAL

BACKGROUND OF THE PRESENT INVENTION

Field of Invention

The present invention relates to an online dynamic balance technology for a main spindle, and more particularly to an integrated online dynamic balance terminal formed by 3D rapid prototyping technology.

Description of Related Arts

A main spindle system is a key component of modern high-end Computer Numeric Control (CNC) machines, in which the performance of conventional CNC machines is mainly determined by the performance of their main spindles. Conventionally, the main spindles tend to have be imbalanced due to material, installation and manufacturing defects. When a main spindle is operating under high speed or ultra-high speed, spindle imbalance may cause the main spindle to have substantial or sharp increase in vibrations, and this substantially affect the overall performance of the CNC machines. Because of the problem that the main spindle of a conventional CNC machine vibrates too much at high speed due to the imbalance of the main spindle, on-site dynamic balance technology has widely been utilized to resolve this phenomenon. However, in the process of balancing the main spindle, a technician needs to turn on and turn off the corresponding CNC machine, and this severely affects the overall efficiency thereof. At the same time, on-site dynamic balance technology can only be utilized when the main spindle is rotating at a specific speed, and this has a greater impact on CNC machines having main spindle with variable speeds.

Online dynamic balance technology can better solve the problems related to on-site dynamic balance technology. On-line dynamic balancing technology focuses on real-time and online monitoring of the main spindle when the main spindle is rotating. Moreover, on-line dynamic balancing technology also focuses on automatic balance of the main spindle. A comprehensive online dynamic balance system may comprise a sensor, a control unit and a balance terminal. Depending on the working principles of the balance terminal, balance terminals may broadly be divided into motor-type balance terminals, electromagnetic balance terminal and liquid-jet balance terminal. The liquid-jet balance terminals have widely been used because of simple and reliable structure, and because of their very strong self-locking capability.

Liquid-jet dynamic balance terminal uses liquid to compensate for imbalance on the part of the main spindle. A conventional dynamic balance terminal may have three or more individual balance cavities, wherein liquid stored in the balance cavities may follow the rotational movement of the main spindle to generate corresponding centrifugal force. The centrifugal force caused by main spindle imbalance may be counteracted by the centrifugal force generated by the liquid in the balance cavities. By carefully controlling the mass of the liquid injected into the balance cavities, the centrifugal may effectively counteracting the unbalanced centrifugal force of the main spindle so as to balance the main spindle. Therefore, the performance of the liquid-jet dynamic balance terminal is the core technology which determines the performance of the overall liquid-jet online balance system.

At present, the production of liquid-jet dynamic balance terminals utilizes traditional machining manufacturing processes in which the balanced cavities must have very good sealing so that the entire balance terminal may not be manufactured as an integral body. Conventional the balance terminal may have an outer annular portion and an inner annular portion in which each of these portions is individually installed and secured. Because of this structure, the outer annular portion and the inner annular portion become loose with respect to the liquid-jet dynamic balance terminals so as to affect the sealing performance of the balance cavities. Moreover, this type of conventional dynamic balance terminals is generally complicated in structure with many functionally insignificant parts. All these contribute to increased weight of the entire liquid-jet dynamic balance terminal.

SUMMARY OF THE PRESENT INVENTION

In order to resolve the above-mentioned problems, an objective of the present invention is to provide an integrated online dynamic balance terminal formed by 3D rapid prototyping technology, which is capable of substantially enhancing sealing performance of balance cavities, and simplifying the overall structure of the integrated online dynamic balance terminal. As such, an overall weight of the integrated online dynamic balance terminal can be minimized.

In one aspect of the present invention, it provides:

an integrated online dynamic balance terminal by 3D rapid prototyping, comprising a central tapered hole 3 formed at a lower portion thereof, a plurality of identical balance cavities 7 peripherally and spacedly formed on the integrated online dynamic balance terminal, wherein each two the adjacent balance cavities are separated by a cavity partition 6, the integrated online dynamic balance terminal further having a plurality of guiding channels 5 indently formed on an inner peripheral surface 10 thereof, wherein each of the four guiding channels 5 communicates with a corresponding balance cavity 7 through a corresponding trapezoidal hole 8, so that liquid injected into the guiding channels 5 is guided to flow into the balance cavities 7 through the trapezoidal hole 8, the integrated online dynamic balance terminal thereof having a plurality of bored holes 2 spacedly formed on an engagement surface 1, wherein the bored holes 2 are centrically formed on the engagement surface 1.

The integrated online dynamic balance terminal is configured from 3D rapid prototyping so as to form an integral one-piece structure, wherein some portions requiring high precision are arranged to undergo additional machining processes, wherein in the 3D rapid prototyping, a rear surface 11 is arranged to be a starting point. The central tapered hole 3 has machining allowances so that after the 3D rapid prototyping, machining precision of the central tapered hole 3 is improved through grinding by cone gauges. An outer circumferential surface 9 of the integrated online dynamic balance terminal has a predetermined machining allowance so that when the integrated online dynamic balance terminal is formed by 3D rapid prototyping, the outer circumferential surface 9 is arranged to undergo additional machining for enhancing surface finish. A design depth of each of the guiding channels 5 is smaller than that of an actual depth, so that after the 3D rapid prototyping, additional machining is carried out to the guiding channels 5 for increasing depths thereof.

Each of the balance cavities 7 has an upper boundary and a lower boundary, wherein each of the upper boundary and the lower boundary has a symmetrically arched shape cross section.

Each of the trapezoidal holes 8 has an upper boundary which has an arch shaped cross section.

The present invention has the following advantageous effects:

The present invention utilizes 3D rapid prototyping to form a one-piece structure in one single procedure, and does not require additional mechanical connections between components. This configuration makes the entire structure of the integrated online dynamic balance terminal to be more reasonable and enhances overall strength and sealing performance of the balance cavities. The present invention also simplifies the structure of balance terminal and substantially minimize a weight thereof. This in turns minimizes the weight added to the main spindle so as to minimize the effect on the dynamic frequency and mechanical properties of the main spindle.

DETAILED DESCRIPTION OF THE PREFERRED EMBODIMENT

The present invention will be further described in detail in conjunction with the drawings and embodiments.

Figure 1:
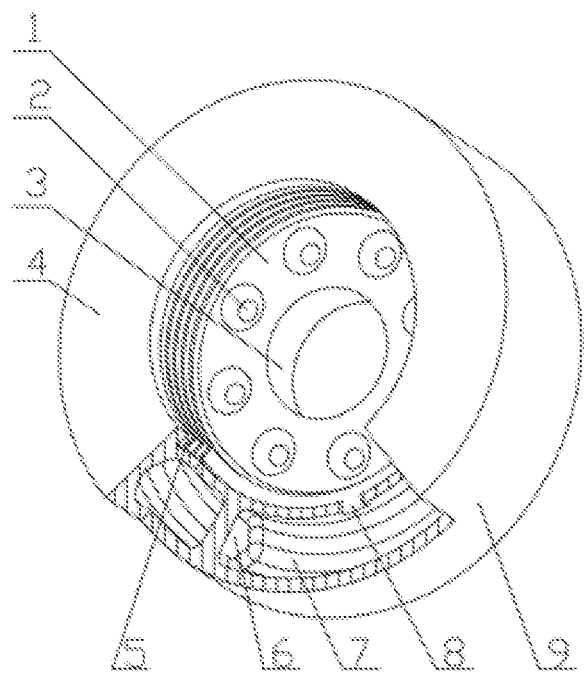
FIG. 1 is a perspective view of an integrated online dynamic balance terminal according to a preferred embodiment of the present invention.
Figure 2:
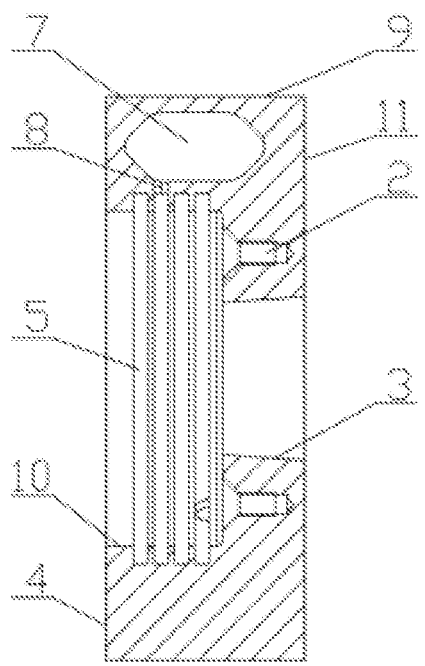
FIG. 2 is a sectional view of the integrated online dynamic balance terminal according to the preferred embodiment of the present invention.
Figure 3:
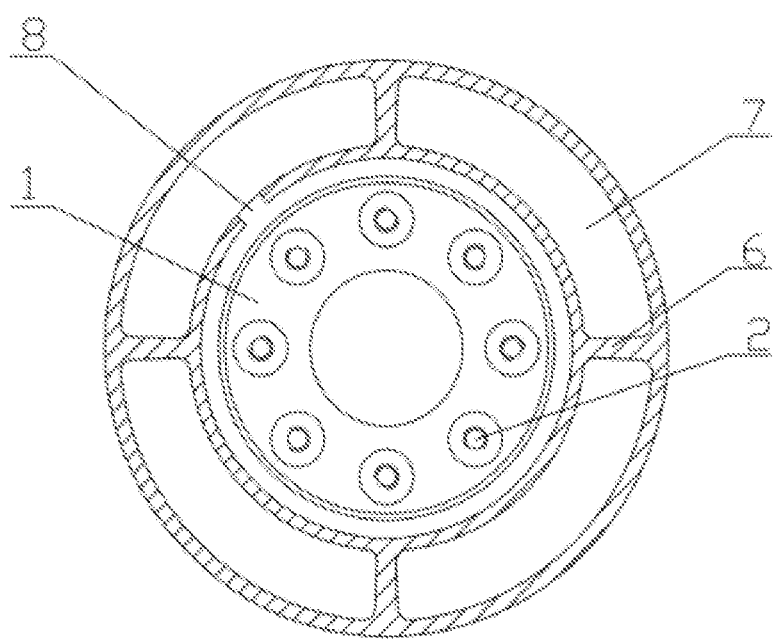
FIG. 3 is a schematic diagram illustrating the relationship between several balance cavities of the integrated online dynamic balance terminal according to the preferred embodiment of the present invention.
Figure 4:
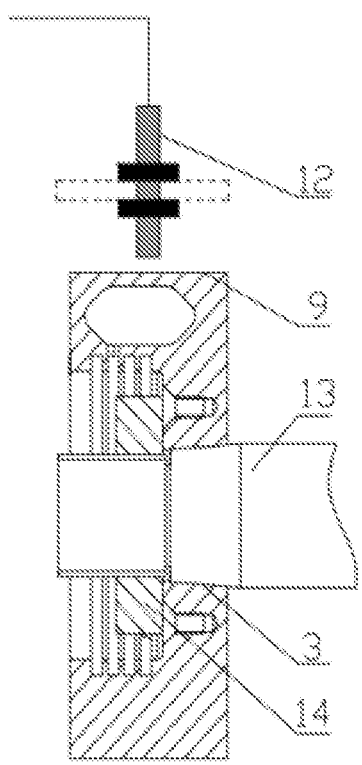
FIG. 4 is a schematic diagram of the integrated online dynamic balance terminal according to the preferred embodiment of the present invention, illustrating the relationship between the integrated online dynamic balance terminal and the main spindle.
Figure 5:
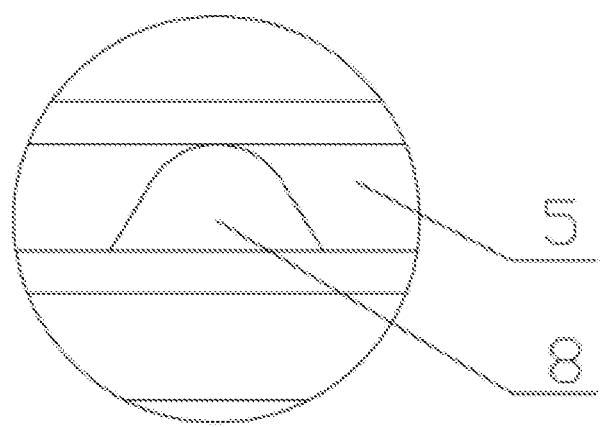
FIG. 5 is schematic diagram of a trapezial hole of the integrated online dynamic balance terminal according to the preferred embodiment of the present invention.

Referring to FIG. 1 to FIG. 5 of the drawings, an integrated online dynamic balance terminal formed by 3D rapid prototyping technology according to a preferred embodiment of the present invention is illustrated. Broadly, the integrated online dynamic balance terminal comprises a central tapered hole 3, wherein the main spindle 13 is connected to the integrated online dynamic balance terminal through the central tapered hole 3. Moreover, the integrated online dynamic balance terminal has four identical balance cavities 7 peripherally and spacedly formed peripherally thereon, wherein each two adjacent balance cavities 7 is separated by a cavity partition 6 so as to avoid liquid from one balance cavity 7 from flowing into other balance cavities 7. The integrated online dynamic balance terminal further has four guiding channels 5 indently formed on an inner peripheral surface 10 thereof, wherein each of the four guiding channels 5 communicates with a corresponding balance cavity 7 through a corresponding trapezoidal hole 8. As such, liquid injected into the guiding channels 5 may be guided to flow into the balance cavities 7 through the trapezoidal hole 8. The integrated online dynamic balance terminal has eight bored holes 2 spacedly formed on an engagement surface 1, wherein the bored holes 2 are centrically formed along an imaginary circumference drawn on the engagement surface 1. The bored holes 2 are utilized for balancing the integrated online dynamic balance terminal. By connecting screws on a predetermined number of bored holes, initial imbalance of the integrated online dynamic balance terminal may be compensated.

It is worth mentioning that the integrated online dynamic balance terminal is configured from 3D rapid prototyping technology so as to form an integral one-piece structure, wherein those portions requiring high precision may undergo additional machining processes. In 3D rapid prototyping, a sensible starting point or foundation may be a rear surface 11 of the integrated online dynamic balance terminal for building up other structures thereof. The central tapered hole 3 may require additional machining so that after 3D rapid prototyping, some sorts of machining tools, such as cone gauges, may be used to perform grinding to improve machining accuracy of the central tapered hole 3, so that it can better fit to the main spindle of the CNC machine.

An outer circumferential surface 9 of the integrated online dynamic balance terminal has a predetermined machining allowance so that when the integrated online dynamic balance terminal has been formed by 3D rapid prototyping, the outer circumferential surface 9 can be arranged to additional machining for enhancing surface finish of the outer circumferential surface 9, so as to increase a reflectivity to the light emitted by a photosensor 12 for enhancing phase discrimination of the outer circumferential surface 9. Furthermore, a design depth of each of the guiding channels 5 should be smaller than that of actual depth, so that after 3D rapid prototyping, additional machining may be carried out to the guiding channels 5 for increasing their depth and ensuring the overall machining quality of each of the guiding channels 5. The integrated online dynamic balance terminal further has a front surface 4, a rear surface 11, an inner supporting surface 10 formed between the outermost guiding channel 5 and the front surface 4. These surfaces do not require high precision and do not need additional machining after 3D rapid prototyping.

Each of the balance cavities 7 has an upper boundary and a lower boundary, wherein each of these upper boundaries and the lower boundary has a symmetrically arched shape cross section so as to ensure even distribution of liquid within the corresponding balance cavity 7. It is worth mention that the arch cross-sectional shape of the upper boundary will ensures sound structural integrity of the entire balance cavity 7, while the arch cross sectional shape of the lower boundary may ensure even distribution of liquid within the corresponding balance cavity 7 so as to enhance balancing performance of the integrated online dynamic balance terminal. Furthermore, the arch structure of the balance cavities 7 can better withstand the force exerted on the integrated online dynamic balance terminal.

Each of trapezoidal holes 8 has an upper boundary which also has an arch shaped cross section or contour so as to improve support conditions for the structure adjacent to the trapezoidal hole 8 during 3D rapid prototyping.

The operation of the present invention is as follows: the central tapered hole 3 is first connected to a tapered end portion of the main spindle 13. After that, the integrated online dynamic balance terminal is secured to the main spindle 13 through the use of bolt nuts 14, so as to ensure secure connection between the integrated online dynamic balance terminal and the main spindle 13 when the main spindle 13 is rotating at very high speed. When the main spindle 13 is rotating at a certain speed, vibrational signals of the main spindle 13 may be monitored and analyzed to determine how much liquid to be injected into the balance cavities 7. After that, a corresponding amount of liquid is injected into the guiding channels 5 by an external liquid injecting apparatus. The liquid injected into the guiding channels 5 may be guided, due to centripetal force, to flow into and stay in the balance cavities 7 through the trapezoidal holes 8. Each two balance cavities 7 are separated by a cavity partition 6 so as to prevent liquid from one balance cavity 7 to enter the other balance cavities 7. At such, when the main spindle 13 is rotating at very high speed, all components of the integrated online dynamic balance terminal will be very secured and do not have substantial unwanted literal movement between components. This substantially maintains the sealing performance of the balance cavities 7 so that volume of the liquid injected in the balance cavities 7 will remain the same before and after dynamic balancing process.

What is claimed is:

1. An integrated online dynamic balance terminal by 3D rapid prototyping, characterized in that said integrated online dynamic balance terminal comprises a central tapered hole (3) formed at a lower portion thereof, a plurality of identical balance cavities (7) peripherally and spacedly formed on said integrated online dynamic balance terminal, wherein each two said adjacent balance cavities are separated by a cavity partition (6), said integrated online dynamic balance terminal further having a plurality of guiding channels (5) indently formed on an inner peripheral surface (10) thereof, wherein each of said four guiding channels (5) communicates with a corresponding balance cavity (7) through a corresponding trapezoidal hole (8), so that liquid injected into said guiding channels (5) is guided to flow into said balance cavities (7) through said trapezoidal hole (8), said integrated online dynamic balance terminal thereof having a plurality of bored holes (2) spacedly formed on an engagement surface (1), wherein said bored holes (2) are centrically formed on said engagement surface (1), each of the balance cavities (7) has an upper boundary and a lower boundary, wherein each of said upper boundary and said lower boundary has a symmetrically arched shape cross section.

2. An integrated online dynamic balance terminal by 3D rapid prototyping, characterized in that said integrated online dynamic balance terminal comprises a central tapered hole (3) formed at a lower portion thereof, a plurality of identical balance cavities (7) peripherally and spacedly formed on said integrated online dynamic balance terminal, wherein each two said adjacent balance cavities are separated by a cavity partition (6), said integrated online dynamic balance terminal further having a plurality of guiding channels (5) indently formed on an inner peripheral surface (10) thereof, wherein each of said four guiding channels (5) communicates with a corresponding balance cavity (7) through a corresponding trapezoidal hole (8), so that liquid injected into said guiding channels (5) is guided to flow into said balance cavities (7) through said trapezoidal hole (8), said integrated online dynamic balance terminal thereof having a plurality of bored holes (2) spacedly formed on an engagement surface (1), wherein said bored holes (2) are centrically formed on said engagement surface (1), each of said trapezoidal holes (8) has an upper boundary which has an arch shaped cross section.

\* \* \* \* \*